(12) United States Patent
Kawanaka et al.

(10) Patent No.: US 9,048,491 B2
(45) Date of Patent: Jun. 2, 2015

(54) LITHIUM-ION SECONDARY BATTERY

(71) Applicant: TDK CORPORATION, Tokyo (JP)

(72) Inventors: Yasuyuki Kawanaka, Tokyo (JP); Kazumasa Tanaka, Tokyo (JP); Yasuhiro Ikeda, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 127 days.

(21) Appl. No.: 13/845,707

(22) Filed: Mar. 18, 2013

(65) Prior Publication Data

US 2013/0260256 A1 Oct. 3, 2013

(30) Foreign Application Priority Data

Mar. 27, 2012 (JP) ................................ 2012-070946
Mar. 13, 2013 (JP) ................................ 2013-050347

(51) Int. Cl.
| | | |
|---|---|---|
| H01M 4/38 | (2006.01) | |
| H01M 2/16 | (2006.01) | |
| H01M 4/134 | (2010.01) | |
| H01M 10/0525 | (2010.01) | |
| H01M 4/02 | (2006.01) | |

(52) U.S. Cl.
CPC .............. *H01M 4/386* (2013.01); *Y02E 60/122* (2013.01); *Y02T 10/7011* (2013.01); *H01M 2/1673* (2013.01); *H01M 4/134* (2013.01); *H01M 10/0525* (2013.01); *H01M 2004/021* (2013.01)

(58) Field of Classification Search
CPC . H01M 4/386; H01M 4/134; H01M 10/0525; H01M 2/1673; H01M 2004/021; Y02E 60/122; Y02T 10/7011
USPC ......................................................... 429/246
See application file for complete search history.

(56) References Cited

U.S. PATENT DOCUMENTS

2009/0239151 A1    9/2009  Nakanishi et al.
2012/0295155 A1*  11/2012  Deng et al. .................... 429/200

FOREIGN PATENT DOCUMENTS

| CN | 101567438 A | 10/2009 |
|---|---|---|
| JP | A-5-74463 | 3/1993 |

* cited by examiner

*Primary Examiner* — Stewart Fraser
(74) *Attorney, Agent, or Firm* — Oliff PLC

(57) ABSTRACT

In the invention, a lithium-ion secondary battery, in which a value obtained by dividing average 3% modulus strength of a separator by average 3% modulus strength of a negative electrode including a negative electrode active material layer containing silicon and silicon oxide as a main component is 0.079 or less, is used.

11 Claims, 1 Drawing Sheet

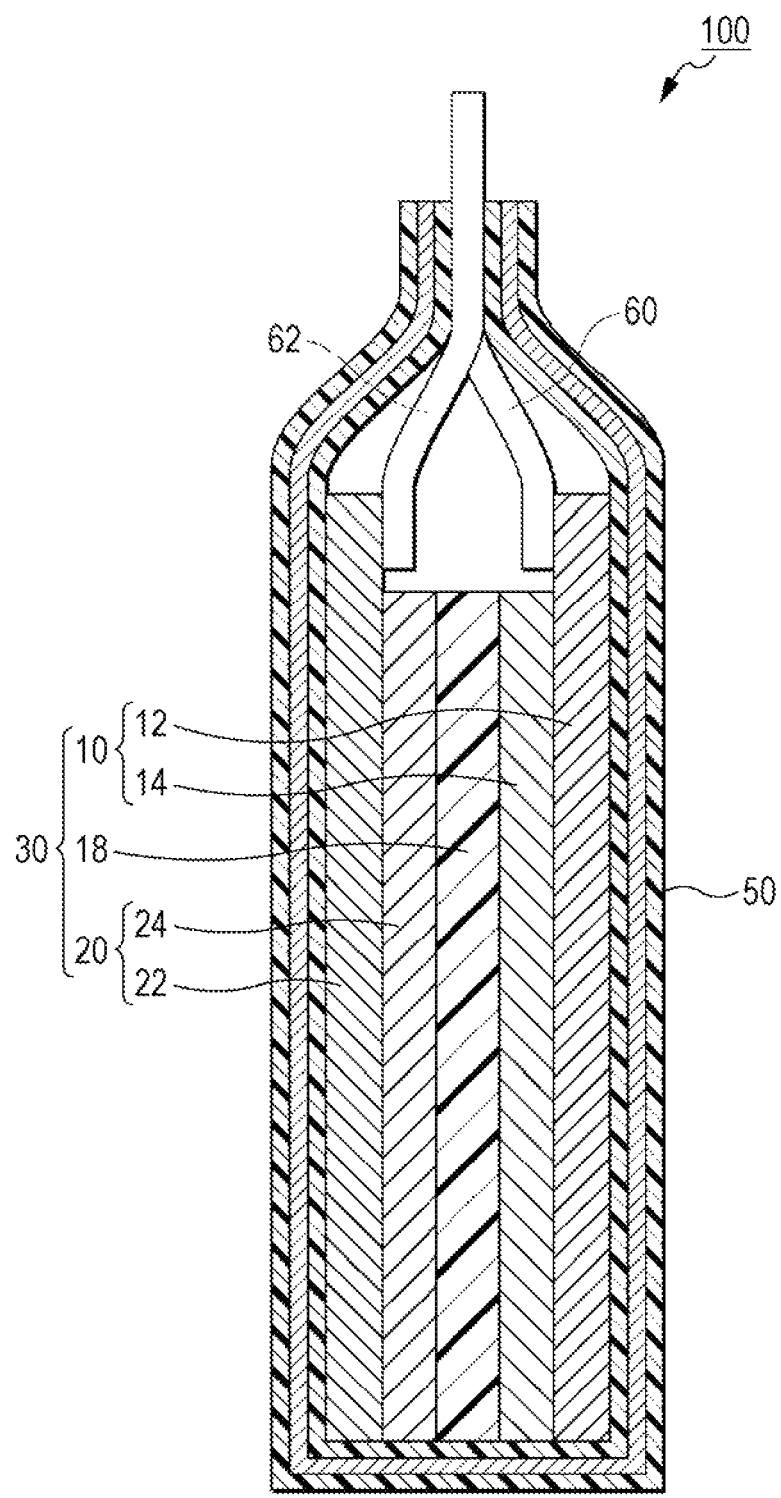

LITHIUM-ION SECONDARY BATTERY

BACKGROUND OF THE INVENTION

1. Field of the Invention

The present invention relates to a lithium-ion secondary battery.

2. Description of the Related Art

The lithium-ion secondary battery is light in weight and has a high capacity compared to a nickel cadmium battery, a nickel hydrogen battery, and thus has a wide range of application for a power supply of a portable electronic apparatus. In addition, the lithium-ion secondary battery is a strong candidate as a power supply that is mounted for a hybrid vehicle or an electric vehicle. In addition, accompanying miniaturization and higher functionality of recent portable electronic apparatuses, high-capacity is expected for the lithium-ion secondary battery that serves as a power supply of these portable electronic apparatuses.

The capacity of the lithium-ion secondary battery mainly depends on an active material of an electrode. In general, graphite is used for a negative electrode active material. However, a theoretical capacity of graphite is 372 mAh/g, and a capacity of approximately 350 mAh/g has been already used in batteries that have been put into practical use. Therefore, it is necessary to realize new high-capacity in order to obtain a nonaqueous electrolytic solution secondary battery having a sufficient capacity as an energy source of high-function portable apparatuses in the future, and thus a negative electrode material having a theoretical capacity higher than that of graphite is necessary.

Therefore, currently, alloy-based negative electrode materials such as silicon and silicon oxide have attracted attention. Silicon is electrochemically intercalating and deintercalating lithium-ions, and is capable of realizing charging/discharging of a very large capacity compared to graphite. Particularly, it is known that the theoretical discharge capacity of silicon is 4,210 mAh/g, and shows a high-capacity 11 times that of graphite.

However, since these alloy-based material forms a lithium-silicon alloy during intercalation of lithium, and is changed from an original crystal structure, very large volume expansion is accompanied.

Particularly, when silicon is charged up to the maximum capacity, the volume theoretically expands 4.1 times. Therefore, an active material is detached from a current collector, and thus electrical conduction disappears. As a result, a charging/discharging cycle characteristic significantly decreases (For example, Japanese Patent No. 2964732).

Furthermore, in the case of using silicon or silicon oxide as the negative electrode active material, accompanying expansion and shrinkage of the negative electrode active material during charging/discharging, a negative electrode itself also expands and shrinks, and friction occurs at an interface between a separator and the negative electrode. Therefore, the negative electrode active material or a conductive auxiliary agent is peeled, and thus the charging/discharging cycle characteristic decreases.

SUMMARY OF THE INVENTION

The invention has been made in consideration of the above-described problems in the related art, and an object thereof is to provide a lithium-ion secondary battery in which a charging/discharging cycle characteristic is improved.

To accomplish the above-described object, according to an embodiment of the invention, there is provided a lithium-ion secondary battery in which a value obtained by dividing average 3% modulus strength of a separator by average 3% modulus strength of a negative electrode including a negative electrode active material layer containing silicon and silicon oxide as a main component is 0.079 or less.

When the lithium-ion secondary battery related to the invention is used, a charging/discharging cycle characteristic may be improved.

In the invention, the average 3% modulus strength is an arithmetic average value of strength (3% modulus strength) of 10 pieces of samples when each negative electrode sample having a width of 50 mm and each separator sample having a width of 50 mm are tensioned by a tensile testing machine until an amount of displacement becomes 0.3 cm, and the sample grows by 3%. Hereinafter, the average modulus strength of the negative electrode is described as $M_3a$, and the average modulus strength of the separator is described as $M_3s$. In the invention, the reason why the modulus strength is used is because elongation behaviors of the negative electrode and the separator are completely different from each other, and thus it is difficult to accurately express a relationship between both of the elongation behaviors with tensile strength. In addition, the reason is also because the modulus strength expresses a relationship between mechanical strength of the separator capable of conforming to the expansion of the negative electrode and mechanical strength of the negative electrode.

When a value ($M_3s/M_3a$) that is obtained by dividing $M_3s$ by $M_3a$ is 0.079 or less, since the separator conforms to the expansion of the negative electrode accompanying the charging/discharging, friction at an interface between the negative electrode and the separator is suppressed, and the peeling of the negative electrode active material or the conductive auxiliary agent is suppressed, and thus the charging/discharging cycle characteristic is improved.

When the $M_3s/M_3a$ exceeds the upper limit, since the negative electrode also expands or shrinks along with the expansion or shrinkage of the negative electrode active material during the charging/discharging, and friction occurs at an interface between the separator and the negative electrode, the negative electrode active material or the conductive auxiliary agent is peeled, and thus the charging/discharging cycle characteristic decreases.

The negative electrode active material related to the invention may contain both of silicon and silicon oxide as a main component. When the above-described active material is used, it is possible to obtain a negative electrode having a capacity higher than that of a case in which graphite is used as the negative electrode active material. In addition, in this specification, the "negative electrode active material layer containing silicon and silicon oxide as a main component" represents that mass of the silicon and silicon oxide on the basis of total mass of the negative electrode active material contained in the negative electrode active material layer is 90% by mass or more. From the viewpoint of accomplishing a relatively larger theoretical capacity, the mass is preferably 95% by mass or more, and more preferably 100% by mass.

In the negative electrode related to the invention, an area expansion rate of the negative electrode after performing 10 cycles of charging/discharging may be 9% or less.

When the expansion of the negative electrode accompanying the charging/discharging exceeds the upper limit, fracture of the negative electrode or peeling of the negative electrode active material layer from the negative electrode current collector due to volume expansion of the negative electrode active material occurs, and thus the charging/discharging cycle characteristic decreases.

Arithmetic average surface roughness Ra (JIS B0601-1994 arithmetic average surface roughness) of the negative electrode related to the invention may be 1 to 4 μm. When the negative electrode has appropriate surface roughness, the separator comes into close contact with the negative electrode due to an anchor effect, and thus the separator conforms to the elongation of the negative electrode during charging, and friction at an interface between the separator and the negative electrode is suppressed, and thus the charging/discharging cycle characteristic is improved.

When the surface roughness of the negative electrode is less than the lower limit, adhesion between the negative electrode and the separator decreases, and thus the separator cannot conform to the elongation of the negative electrode during charging. Therefore, the negative electrode active material or the conductive auxiliary agent is peeled due to friction at the interface between the separator and the negative electrode. The peeled negative electrode active material does not contribute to the charging/discharging, and thus the charging/discharging cycle characteristic decreases. In addition, resistance of the negative electrode active material increases due to the peeling of the conductive auxiliary agent, and thus the charging/discharging cycle characteristic decreases.

When the surface roughness of the negative electrode exceeds the upper limit, the negative electrode active material or the conductive auxiliary agent is peeled due to the friction caused by a large convex portion during the charging/discharging cycle, and thus charging/discharging cycle characteristic decreases. In addition, large concavity and convexity make biting of the separator by the negative electrode active material layer deep, and thus it is considered that possibility of occurrence of internal short-circuit is raised.

According to the invention, it is possible to provide a lithium-ion secondary battery in which friction between the separator and the negative electrode is suppressed, and thus a charging/discharging cycle characteristic of the lithium-ion secondary battery can be improved.

BRIEF DESCRIPTION OF THE DRAWINGS

FIGURE is a schematic cross-sectional view of a lithium-ion secondary battery related to this embodiment.

DESCRIPTION OF THE PREFERRED EMBODIMENTS

Hereinafter, a preferred embodiment of the invention will be described with reference to the accompanying drawing. In addition, the invention is not limited to the following embodiment. In addition, components described below include components that may be easily assumed by a person having ordinary skill in the art, and components that are substantially the same. Furthermore, the components described below may be appropriately combined.

As shown in FIG. 1, a lithium-ion secondary battery 100 related to this embodiment includes a staked body 30 including sheet-shaped negative electrode 20 and sheet-shaped positive electrode 10 that are opposite to each other, and a sheet-shaped separator 18 that is adjacently disposed between the negative electrode 20 and the positive electrode 10, an electrolytic solution containing lithium-ions, a casing 50 that accommodates these components in a hermetic state, a negative electrode lead 62 of which one end is electrically connected to the negative electrode 20 and the other end protrudes to the outside of the casing, and a positive electrode lead 60 of which one end is electrically connected to the positive electrode 10 and the other end protrudes to the outside of the casing.

The negative electrode 20 includes a negative electrode current collector 22, and a negative electrode active material layer 24 that is formed on the negative electrode current collector 22. In addition, the positive electrode 10 includes a positive electrode current collector 12, and a positive electrode active material layer 14 that is formed on the positive electrode current collector 12. The separator 18 is positioned between the negative electrode active material layer 24 and the positive electrode active material layer 14.

Arithmetic average surface roughness Ra (JIS B0601-1994 arithmetic average surface roughness) of the negative electrode 20 of this embodiment is 1 to 4 μm. When the negative electrode 20 has appropriate surface roughness, the separator 18 and the negative electrode 20 come into close contact with each other due to an anchor effect, and thus the separator 18 conforms to the elongation of the negative electrode 20 during charging, and friction between the separator 18 and the negative electrode 20 is suppressed, and thus the charging/discharging cycle characteristic is improved.

When the surface roughness of the negative electrode 20 is less than the lower limit, adhesion between the negative electrode 20 and the separator 18 decreases. Therefore, the separator 18 cannot conform to the elongation of the negative electrode 20 during charging, and the separator 18 and the negative electrode 20 scrap each other. Therefore, the negative electrode active material or the conductive auxiliary agent is peeled, and thus the charging/discharging cycle characteristic decreases.

When the surface roughness of the negative electrode 20 exceeds the upper limit, the negative electrode active material or the conductive auxiliary agent is peeled due to the friction caused by a large convex portion during the charging/discharging cycle, and thus the charging/discharging cycle characteristic decreases. In addition, large concavity and convexity make biting of the separator by the negative electrode active material layer 24 deep, and thus it is considered that possibility of occurrence of internal short-circuit is raised.

The negative electrode 20 of this embodiment is preferably configured to have an area expansion rate of 9% or less after performing 10 cycles of charging/discharging by arbitrarily combining the following components with the following range.

When the expansion of the negative electrode accompanying the charging/discharging exceeds the upper limit, the negative electrode may be fractured due to the expansion of the negative electrode active material, and the negative electrode active material or the conductive auxiliary agent is peeled, and thus the charging/discharging cycle characteristic decreases.

The negative electrode 20 of this embodiment has a structure in which the negative electrode active material layer 24 containing the negative electrode active material is formed on one surface or both surfaces of the negative electrode current collector 22. The negative electrode active material layer 24 may be manufactured by applying a coating material containing the negative electrode active material, a binder, a conductive auxiliary agent, and a solvent on the negative electrode current collector 22, and removing the solvent in the coating material.

The negative electrode active material contains silicon and silicon oxide as a main component, and may contain both of these. As the silicon oxide, silicon monoxide (SiO), silicon dioxide ($SiO_2$), or the like may be used. These may be used alone or in combination of two or more kinds. In addition, mass of the silicon and silicon oxide on the basis of total mass of the negative electrode active material contained in the negative electrode active material layer is 90% by mass or more. From the viewpoint of accomplishing a relatively larger theoretical capacity, the mass is preferably 95% by mass or more, and more preferably 100% by mass.

The binder performs binding of the negative electrode active material, and performs binding between the negative electrode active material and the current collector 22. The binder may be an arbitrary binder as long as the binder is capable of performing the above-described binding, and for example, a fluorine resin such as polyvinylidene fluoride (PVDF), cellulose, a styrene butadiene rubber, a polyimide resin, a polyamide imide resin, or the like may be used.

Although not particularly limited, the content of the binder in the negative electrode active material layer 24 is preferably 1 to 30% by mass on the basis of the total mass of the negative electrode active material, the conductive auxiliary agent, and the binder, and more preferably 5 to 15% by mass.

There is no particular limitation to the conductive auxiliary agent as long as the conductive auxiliary agent makes conductivity of the negative electrode active material layer 24 satisfactory, and conductive auxiliary agent that is known in the related art may be used.

The content of the conductive auxiliary agent in the negative electrode active material layer 24 is also not particularly limited. However, in the case of being added, commonly, the content of the conductive auxiliary agent is preferably 1 to 10% by mass on the basis of the total mass of the negative electrode active material, the conductive auxiliary agent, and the binder.

The negative electrode current collector 22 is preferably constituted by a conductive sheet having a small thickness. Specifically, the negative electrode current collector 22 is preferably constituted by metal foil having a thickness of 8 to 30 μm. The current collector is preferably formed from a material that is not alloyed with lithium. Examples of a particularly preferable material include copper, and copper foil whose surface is roughened is preferable.

Examples of the copper foil include electrolytic copper foil. For example, the electrolytic copper foil is copper foil that is obtained by immersing a metallic drum in an electrolytic solution in which copper ions are dissolved, by making a current flow to the metallic drum while rotating the drum in order for copper to precipitate on a surface of the drum, and by peeling the precipitated copper.

In addition, the copper foil may be rolled copper foil that is manufactured by rolling a cast copper ingot to have a desired thickness, or may be copper foil that is obtained by causing copper to precipitate on a surface of the rolled copper foil by an electrolytic method, and a surface of the copper is roughened.

As the solvent, for example, N-methyl-2-pyrrolidone, N-N-dimethylformamide, or the like may be used.

An application method is not particularly limited, and a method commonly adapted in a case of preparing an electrode may be used. Examples of the application method include a slit die coating method, a doctor blade method, and the like.

A method of removing the solvent in the coating material applied onto the negative electrode current collector 22 is not particularly limited, and the negative electrode current collector 22 onto which the coating material is applied may be dried, for example, at 80 to 150° C.

The negative electrode 20, in which the negative electrode active material layer 24 is formed in this manner, may be pressed as necessary, for example, by a roll press machine or the like. For example, a linear pressure of the roll press may be set to 50 to 7,000 kgf/cm.

Strain hardening is introduced to the negative electrode current collector 22 by the press treatment, and thus the negative electrode 20, in which the average modulus strength $M_3a$ is improved and which has desired surface roughness, may be obtained.

Through the above-described negative electrode manufacturing process, the negative electrode 20 of this example may be manufactured.

Examples of a positive electrode active material include oxides or sulfides capable of intercalating and deintercalating lithium-ions, and any one kind or two or more kinds thereof may be used. Specifically, examples of the positive electrode active material include a metal oxide that does not contain lithium, a metal sulfide, and a lithium composite oxide that contain lithium. As the positive electrode current collector 12, the binder, and the conductive auxiliary agent, materials that are known in the related art may be used, and the positive electrode 10 may be manufactured by forming the positive electrode active material layer 14 on the positive electrode current collector 12 through the process that is previously exemplified in the negative electrode manufacturing process.

With regard to the separator 18 of this embodiment, it is necessary for the average modulus strength $M_3s$ to be 2.5 N/5 cm width or more so as to secure minimum mechanical strength, and 2.8 N/5 cm width or more is preferable. When the minimum mechanical strength is secured, an electrode burr may be prevented from penetrating through the separator 18, or the separator 18 may be prevented from being torn by an edge of the electrode during manufacturing of a battery.

A material of the separator 18 may be an arbitrary material as long as this material is stable with respect to the electrolytic solution, and generally, polyolefin such as polyethylene and polypropylene is preferable.

In the negative electrode 20 of this embodiment, a value ($M_3s/M_3a$) that is obtained by dividing the average modulus strength $M_3s$ of the separator by the average modulus strength $M_3a$ of the negative electrode is 0.079 or less. In this range, since the separator 18 conforms to the expansion of the negative electrode 20, which accompanies the charging/discharging, peeling of the negative electrode active material or the conductive auxiliary agent is suppressed, and thus the charging/discharging cycle characteristic of the lithium-ion secondary battery 100 is easily increased. In addition, when the area expansion rate of the negative electrode 20 after 10 cycles is 9% or less, and the surface roughness of the negative electrode 20 is 1 to 4 μm, the charging/discharging cycle characteristic of the lithium-ion secondary battery 100 may be easily increased in a further significant manner. With regard to the charging/discharging cycle characteristic of the lithium-ion secondary battery 100, a capacity retention rate is preferably 45% or more after 500 cycles, more preferably 50% or more, and still more preferably 55% or more. In addition, the invention may be carried out after appropriately adjusting manufacturing conditions such as the linear pressure of the press treatment, an application amount of the negative electrode active material, an application amount of the positive electrode active material, the thickness of the negative electrode current collector, and physical properties of the separator in order for the average modulus strength $M_3a$, $M_3s/M_3a$, the area expansion rate of the negative electrode, and the surface roughness of the negative electrode to be within a desired range.

With regard to the electrolytic solution, for example, as the solvent, an aprotic high-permittivity solvent such as ethylene carbonate and propylene carbonate, or an aprotic low-viscosity solvent such as dimethyl carbonate, diethyl carbonate, and ethyl methyl carbonate may be used. As an electrolyte, for example, a lithium salt such as $LiBF_4$, $LiPF_6$, and $LiClO_4$ may be used.

There is no particular limitation to the casing 50 as long as the casing 50 is capable of suppressing leakage of the electrolytic solution to the outside, intrusion of moisture or the like into the inside of the lithium-ion secondary battery 100 from the outside, and the like.

The leads 60 and 62 are formed from a conductive material such as aluminum.

Hereinbefore, description has been made with respect to a preferred embodiment of the invention, but the invention is not limited to the embodiment. For example, the lithium-ion secondary battery is not limited to a type a shape shown in FIG. 1, and may be a coin type in which electrodes and a separator that are punched into a coin shape are stacked, a cylinder type in which electrode sheets and a separator are wound in a spiral shape, and the like.

Evaluation is performed by the following method.

Measurement of Charging/Discharging Cycle Characteristic

A secondary battery charging/discharging test apparatus is used, a voltage range is set to 2.5 to 4.2 V, charging is performed with a current value at 0.5 C when 1 C is set to 1,600 mAh/g, and discharging is performed with a current value at 1.0 C. Then, evaluation of the charging/discharging cycle characteristic is performed. In addition, when a discharge capacity of a first cycle is set as an initial discharge capacity, the capacity retention rate (%) is a ratio of a discharge capacity at each cycle with respect to the initial discharge capacity, that is, 100×(the discharge capacity at each cycle)/the initial discharge capacity). As the capacity retention rate is higher, the charging/discharging cycle characteristic is regarded as satisfactory.

Evaluation of Modulus Strength

Evaluation of the average 3% modulus strength is performed with respect to negative electrodes that are prepared in examples and comparative examples and a separator that is used by using a tensile testing machine. Each of the negative electrodes and the separators is collected in a rectangular shape having dimensions of 10 cm in a longitudinal direction and 5 cm in a direction (width direction) orthogonal to the longitudinal direction, and is interposed between chucks (10 cm) of the tensile test machine. Measurement of strength (3% modulus strength) when being tensioned by 0.3 cm (3%) at a tension speed of 300 mm/min is performed with respect to arbitrarily selected 10 pieces of samples, and an arithmetic average value of these 10 pieces is set as average 3% modulus strength.

Evaluation of Area Expansion Rate of Negative Electrode

With respect to lithium-ion secondary battery that are prepared in examples and comparative examples, a voltage range is set to 2.5 to 4.2 V, charging is performed with a current value at 0.5 C when 1 C is set to 1,600 mAh/g, and discharging is performed with a current value at 1.0 C, and 10 cycles of the charging/discharging are performed. Then, each of the batteries is dissembled, and an area of the negative electrode is measured using an XY counter of a profile projector to calculate the area expansion rate. In addition, the expansion rate of the negative electrode is calculated using the following Expression (1).

Expansion rate(%)of negative electrode=1−(area of negative electrode($mm^2$)after 10 cycles/area of negative electrode($mm^2$)before charging/discharging cycle)      (1)

Evaluation of Arithmetic Average Surface Roughness Ra

With respect to the arithmetic average surface roughness Ra of the negative electrodes that are prepared in examples and comparative examples, evaluation is performed by using an ultra-depth shape measuring microscope according to description of JIS B0601-1994.

EXAMPLES

Example 1

Manufacturing of Negative Electrode

As the negative electrode active material, a material, which was obtained by mixing Si and SiO in a ratio (Si/SiO) of 1/2 (weight ratio) and pulverizing and mixing the resultant mixture using a planetary ball mill, was used. As a medium of the planetary ball mill, an alumina bead having a diameter of 3 mm was used, the number of revolutions was set to 500 rpm, and a pulverizing and mixing time was set to 60 min. 77 parts by mass of the mixture of Si and SiO as the negative electrode active material, 3 parts by mass of acetylene black as the conductive auxiliary agent, and 20 parts by mass of polyamide imide as the binder were mixed to prepare a negative electrode mixture. Subsequently, the negative electrode mixture was dispersed in N-methyl-2-pyrrolidone to prepare a paste-shaped negative electrode mixture coating material. This negative electrode mixture coating material was applied to both surfaces of copper foil having a thickness of 10 μm in an application amount of the negative electrode active material of 2.2 mg/$cm^2$, and then drying was performed at 100° C. to form the negative electrode active material layer. Then, the resultant object was pressed by a roller press having a linear pressure of 2,000 kgf/cm, and was heat-treated in vacuum at 270 to 350° C. for 1 to 3 hours, whereby a negative electrode having $M_3a$ of 139.7 N/50 mm was prepared.

Preparation of Positive Electrode 90 parts by mass of $LiNi_{0.85}Co_{0.10}Al_{0.05}O_2$ as the positive electrode active material, 5 parts by mass of acetylene black as the conductive auxiliary agent, and 5 parts by mass of polyvinylidene fluoride as the binder were mixed to prepare a positive electrode mixture. Subsequently, the positive electrode mixture was dispersed in N-methyl-2-pyrrolidone to prepare a paste-shaped positive electrode mixture coating material. This positive electrode mixture coating material was applied to both surfaces of aluminum foil having a thickness of 20 μm in an application amount of the positive electrode active material of 13.6 mg/$cm^2$, and then drying was performed at 100° C. to form the positive electrode active material layer. Then, the resultant object was pressed by a roller press to prepare a positive electrode.

Preparation of Lithium-ion Secondary Battery for Evaluation

A separator, which was constituted by a porous polyethylene film having a thickness of 18 μm and in which $M_3s$ was 5.9 N/50 mm, was inserted between the negative electrode and the positive electrode that were prepared as described above. The resultant stacked body was put into an aluminum laminate pack, $LiPF_6$ solution (solvent: ethylene carbonate and diethyl carbonate in a volume ratio of 3:7) having a concentration of 1 M as the electrolytic solution was injected into the aluminum laminated pack, and then vacuum sealing was performed, whereby a lithium-ion secondary battery for evaluation was prepared.

Examples 2 to 14

The thickness of the negative electrode current collector and a pressing condition were changed, respectively, as shown in Table 1 to be described below, and negative electrodes of Examples 2 to 14 were obtained in the same manner as Example 1. In addition, lithium-ion secondary batteries for evaluation of Examples 2 to 14 were prepared in the same manner as Example 1 by using the negative electrodes that were obtained, and separators having $M_3s$ of 2.8 N/50 mm, 3.4 N/50 mm, 4.2 N/50 mm, 5.4 N/50 mm, 5.9 N/50 mm or 8.0 N/50 mm, and by combining the negative electrodes and the separators as shown in Table 1 to be described below.

Example 15

A negative electrode of Example 15 was obtained in the same manner as Example 1 except that the application was performed by setting the application amount of the negative electrode active material to 3.3 mg/cm2, and by setting the application amount of the positive electrode active material to 20.4 mg/cm². In addition, a lithium-ion secondary battery for evaluation of Example 15 was prepared in the same manner as Example 1 by using the negative electrode that was obtained.

Examples 16 to 24

The pressing condition was changed as shown in Table 1 to be described below, and negative electrodes of Examples 16 to 24 were obtained in the same manner as Example 15. In addition, lithium-ion secondary batteries for evaluation of Examples 16 to 24 were prepared in the same manner as Example 1 by using the negative electrodes that were obtained, and separators having $M_3s$ of 2.8 N/50 mm, 3.4 N/50 mm, 4.2 N/50 mm, 5.9 N/50 mm or 8.0 N/50 mm, and by combining the negative electrodes and the separators as shown in Table 1 to be described below.

Comparative Examples 1 to 3

The pressing conditions were changed, respectively, as shown in Table 1 to be described below, and negative electrodes of Comparative Examples 1 to 3 were obtained in the same manner as Example 1. In addition, lithium-ion secondary batteries for evaluation of Comparative Examples 1 to 3 were prepared in the same manner as Example 1 by using the negative electrodes of Comparative Examples 1 to 3, and a separator, which was constituted by a porous polyethylene film having a thickness of 21 μm and in which $M_3s$ was 8.0 N/50 mm.

Comparative Example 4

A negative electrode of Comparative Example 4 was obtained in the same manner as Example 1 except that the application was performed by setting the application amount of the negative electrode active material to 4.4 mg/cm2, and by setting the application amount of the positive electrode active material to 27.2 mg/cm². In addition, a lithium-ion secondary battery for evaluation of Comparative Example 4 was prepared in the same manner as Example 1 by using the negative electrode of Comparative Example 4, and a separator, which is constituted by a porous polyethylene film having a thickness of 37 μm and in which $M_3s$ was 14.6 N/50 mm.

Comparative Examples 5 and 6

The pressing condition was changed, respectively, as shown in Table 1 to be described below, and negative electrodes of Comparative Examples 5 and 6 were obtained in the same manner as Comparative Example 4. In addition, lithium-ion secondary batteries for evaluation of Comparative Examples 5 and 6 were prepared in the same manner as Comparative Example 4 by using the negative electrode that was obtained.

Comparative Examples 7 to 9

The thickness of the negative electrode current collector and the pressing condition were changed, respectively, as shown in Table 1 to be described below, and negative electrodes of Comparative Examples 7 to 9 were obtained in the same manner as Comparative Example 4. In addition, lithium-ion secondary batteries for evaluation of Comparative Examples 7 to 9 were prepared in the same manner as Comparative Example 4 by using the negative electrode that was obtained.

Measurement of Charging/Discharging Cycle Characteristic

With respect to the lithium-ion secondary batteries for evaluation that were prepared in the examples and comparative examples, evaluation of the charging/discharging cycle characteristic was performed. Results thereof are shown in Table 1.

Evaluation of Modulus Strength

With respect to the negative electrodes and the separators that were used in the examples and comparative examples, evaluation of the average 3% modulus strength $M_3a$ and the average 3% modulus strength $M_3s$ was performed. Results thereof are shown in Table 1.

Evaluation of Area Expansion Rate of Negative Electrode

With respect to the negative electrodes that were prepared in the examples and comparative examples, an area of each of the negative electrodes before and after performing 10 cycles of charging/discharging was measured, and an area expansion rate of the negative electrode was calculated. Results are shown in Table 1.

Evaluation of Arithmetic Average Surface Roughness Ra

Evaluation of the arithmetic average surface roughness Ra of the negative electrodes that were used in the examples and comparative examples was performed. Results thereof are shown in Table 1.

As shown in Table 1, a satisfactory charging/discharging cycle characteristic was obtained in Examples 1 to 22, but the charging/discharging cycle characteristic was not improved in Comparative Examples 1 to 3. This reason is considered to be because $M_3s$ is larger than $M_3a$ to a certain degree exceeding the range that is defined in the invention, and thus the separator does not conform to the expansion of the negative electrode that accompanies the discharging, friction occurs at the interface between the separator and the negative electrode, peeling of the negative electrode active material or the conductive auxiliary agent occurs, and thus the charging/discharging cycle characteristic is not improved.

In Comparative Examples 4 to 6, the above-described reason is considered to be because the expansion of the negative electrode is large, and the separator also cannot conform to the expansion, and thus the charging/discharging cycle characteristic is not improved.

Similarly to Comparative Examples 4 to 9, in Comparative Examples 7 to 9, the above-described reason is considered to be because the expansion of the negative electrode is large, the separator cannot conform to the expansion, the surface roughness is large, and the deintercalation of the negative electrode active material is easy to occur due to abrasion, and thus particularly, the charging/discharging cycle characteristic is not improved.

TABLE 1

| | Thickness of negative electrode current collector (μm) | Linear pressure (kgf/cm) | $M_3a$ (N/50 mm) | $M_3s$ (N/50 mm) | $M_3s/M_3a$ | Area expansion rate of negative electrode (%) | Arithmetic average surface roughness Ra of negative electrode (μm) | Capacity retention rate after 500 cycles (%) |
|---|---|---|---|---|---|---|---|---|
| Example 1 | 12 | 2000 | 139.7 | 5.9 | 0.042 | 6.0 | 2.6 | 56.1 |
| Example 2 | 12 | 1200 | 134.1 | 5.9 | 0.044 | 6.3 | 2.7 | 56.8 |
| Example 3 | 12 | 800 | 132.7 | 5.9 | 0.044 | 6.4 | 3.4 | 57.4 |
| Example 4 | 12 | 2000 | 139.7 | 2.8 | 0.020 | 6.0 | 2.6 | 55.3 |
| Example 5 | 12 | 2000 | 139.7 | 3.4 | 0.024 | 6.0 | 2.6 | 55.3 |
| Example 6 | 12 | 2000 | 139.7 | 4.2 | 0.030 | 6.0 | 2.6 | 57.1 |
| Example 7 | 12 | 2000 | 139.7 | 5.4 | 0.039 | 6.0 | 2.6 | 61.0 |
| Example 8 | 12 | 1200 | 134.1 | 5.4 | 0.040 | 6.3 | 2.7 | 59.0 |
| Example 9 | 17 | 3000 | 189.2 | 5.9 | 0.031 | 4.4 | 3.8 | 62.2 |
| Example 10 | 17 | 1000 | 185.8 | 5.9 | 0.032 | 4.5 | 4.0 | 62.9 |
| Example 11 | 10 | 5000 | 104.2 | 8.0 | 0.077 | 8.1 | 2.4 | 54.4 |
| Example 12 | 10 | 3000 | 101.5 | 8.0 | 0.079 | 8.3 | 2.5 | 54.9 |
| Example 13 | 12 | 300 | 126.3 | 8.0 | 0.083 | 8.7 | 4.7 | 53.9 |
| Example 14 | 12 | None | 122.4 | 8.0 | 0.085 | 8.9 | 5.9 | 50.8 |
| Example 15 | 12 | 2000 | 147.7 | 5.9 | 0.040 | 8.6 | 4.2 | 52.8 |
| Example 16 | 12 | 1500 | 144.8 | 5.9 | 0.041 | 9.0 | 4.4 | 51.6 |
| Example 17 | 12 | 2000 | 147.7 | 2.8 | 0.019 | 8.6 | 4.2 | 51.4 |
| Example 18 | 12 | 2000 | 147.7 | 3.4 | 0.023 | 8.6 | 4.2 | 52.7 |
| Example 19 | 12 | 2000 | 147.7 | 4.2 | 0.028 | 8.6 | 4.2 | 53.1 |
| Example 20 | 12 | 1000 | 141.4 | 8.0 | 0.057 | 9.4 | 4.8 | 47.6 |
| Example 21 | 12 | 300 | 137.2 | 8.0 | 0.058 | 12.8 | 5.2 | 44.8 |
| Example 22 | 12 | 1000 | 141.4 | 2.8 | 0.020 | 9.4 | 4.8 | 48.5 |
| Example 23 | 12 | 1000 | 141.4 | 3.4 | 0.024 | 9.4 | 4.8 | 48.7 |
| Example 24 | 12 | 1000 | 141.4 | 4.2 | 0.030 | 9.4 | 4.8 | 49.1 |
| Comparative Example 1 | 10 | 1000 | 98.1 | 8.0 | 0.082 | 8.4 | 2.8 | 35.4 |
| Comparative Example 2 | 10 | 600 | 98.1 | 8.0 | 0.083 | 8.6 | 3.1 | 34.8 |
| Comparative Example 3 | 10 | 300 | 94.9 | 8.0 | 0.084 | 8.8 | 3.7 | 33.6 |
| Comparative Example 4 | 12 | 5000 | 182 | 14.6 | 0.090 | 9.5 | 2.9 | 31.3 |
| Comparative Example 5 | 12 | 3500 | 158 | 14.6 | 0.092 | 10.1 | 3.0 | 30.4 |
| Comparative Example 6 | 12 | 3000 | 155 | 14.6 | 0.094 | 10.8 | 3.7 | 28.1 |
| Comparative Example 7 | 10 | 2000 | 118 | 14.6 | 0.124 | 16.7 | 4.8 | 23.5 |
| Comparative Example 8 | 10 | 1200 | 112 | 14.6 | 0.130 | 18.3 | 4.8 | 21.3 |
| Comparative Example 9 | 10 | 800 | 108 | 14.6 | 0.135 | 19.1 | 5.3 | 15.4 |

According to the invention, a lithium-ion secondary battery in which the charging/discharging cycle characteristic is excellent may be provided.

What is claimed is:

1. A lithium-ion secondary battery comprising:
   a negative electrode including a negative electrode active material layer containing silicon and/or silicon oxide as a main component; and
   a separator,
      wherein a value obtained by dividing an average 3% modulus strength of the separator by an average 3% modulus strength of the negative electrode is 0.079 or less.

2. The lithium-ion secondary battery according to claim 1, wherein an area expansion rate of the negative electrode after performing 10 cycles of charging/discharging is 9% or less.

3. The lithium-ion secondary battery according to claim 1, wherein an arithmetic average surface roughness Ra of the negative electrode is from 1 to 4 μm.

4. The lithium-ion secondary battery according to claim 1, wherein the average 3% modulus strength of the separator is 2.5 N/5 cm or more.

5. The lithium-ion secondary battery according to claim 1, wherein the average 3% modulus strength of the separator is 2.8 N/5 cm or more.

6. The lithium-ion secondary battery according to claim 3, wherein the average 3% modulus strength of the separator is 2.5 N/5 cm or more.

7. The lithium-ion secondary battery according to claim 1, wherein the negative electrode active material layer further contains a binder, and a content of the binder is from 1 to 30% by mass based on a total mass of negative electrode active material in the negative electrode active material layer.

8. The lithium-ion secondary battery according to claim 7, wherein the content of the binder is from 5 to 15% by mass based on the total mass of the negative electrode active material in the negative electrode active material layer.

9. The lithium-ion secondary battery according to claim 1, wherein the negative electrode active material layer further contains a conductive auxiliary agent, and a content of the conductive auxiliary agent is from 1 to 10% by mass based on a total mass of negative electrode active material in the negative electrode active material layer.

10. The lithium-ion secondary battery according to claim 1, wherein the negative electrode further includes a negative electrode current collector having a thickness of from 8 to 30 µm.

11. The lithium-ion secondary battery according to claim 1, wherein a content of the silicon and/or silicon oxide in a negative electrode active material of the negative electrode active material layer is 90% by mass or more.

* * * * *